(12) United States Patent  
Ranjan et al.

(10) Patent No.: US 11,574,569 B2
(45) Date of Patent: Feb. 7, 2023

(54) MULTIPLE VIEWPORT FLEXIBLE SCREEN

(71) Applicant: Salesforce.com, Inc., San Francisco, CA (US)

(72) Inventors: Sushmita Ranjan, Hyderabad (IN); Vimal Sharma, Bangalore (IN)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/153,682

(22) Filed: Jan. 20, 2021

(65) Prior Publication Data
US 2022/0230569 A1     Jul. 21, 2022

(51) Int. Cl.
*G09G 3/00*     (2006.01)
*G09G 5/14*     (2006.01)

(52) U.S. Cl.
CPC .............. *G09G 3/035* (2020.08); *G09G 5/14* (2013.01); *G09G 2380/02* (2013.01)

(58) Field of Classification Search
CPC .... G06F 1/1615; G06F 1/1626; G06F 3/0412; G06F 1/1652; G06F 1/1656; G06F 1/1641; G09G 5/003; G06T 3/40
See application file for complete search history.

(56) References Cited

U.S. PATENT DOCUMENTS

2006/0238494 A1* 10/2006 Narayanaswami ..... G06F 3/011 345/156
2011/0227822 A1* 9/2011 Shai ...................... G06F 1/1615 345/156
2016/0246470 A1* 8/2016 Doi ....................... G06F 1/1677

\* cited by examiner

*Primary Examiner* — Shaheda A Abdin
(74) *Attorney, Agent, or Firm* — Polygon IP, LLP

(57) ABSTRACT

Described herein are systems, apparatus, methods and computer program products configured to detect bends within a flexible display and utilize the flexible display to provide a plurality of viewports. A geometry identifier may be electrically coupled to the flexible display and allow for determination of bends of the flexible display and for segregating the display into a plurality of viewport based on the bends.

20 Claims, 7 Drawing Sheets

MULTIPLE VIEWPORT FLEXIBLE SCREEN

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to flexible, foldable, bendable, stretchable, and/or rollable displays and more specifically to providing viewports for flexible displays.

BACKGROUND

Flexible display devices are configured to be folded, rolled, bent, stretched, and/or shaped in other manners. Flexible display devices allow for users to change the shape of the device to what the user prefers or needs. Currently, such devices, while folded, rolled, bent, stretched, and/or shaped, will still utilize the entire screen for display of content, similar to non-foldable devices. However, due to the fold, bend, stretch, or roll, the usability of the electronic device is compromised as a user may not be able to view the entire content on the display due to the geometry of the folded display.

BRIEF DESCRIPTION OF THE DRAWINGS

The included drawings are for illustrative purposes and serve only to provide examples of possible structures and operations for the disclosed inventive systems, apparatus, methods and computer program products for viewport identification and display for flexible displays. These drawings in no way limit any changes in form and detail that may be made by one skilled in the art without departing from the spirit and scope of the disclosed implementations.

DETAILED DESCRIPTION

Some implementations of the disclosed systems, apparatus, methods and computer program products are configured to detect bends, folds, rolls, stretches, and/or manipulations of shape for a flexible display and utilize the flexible display to identify and/or provide a plurality of viewports. A system may include a flexible display as well as a geometry identifier electrically coupled to the flexible display. The system may be configured to determine a first bend of the flexible display, segregate the display into at least a first viewport and a second viewport, and display first view content within the first viewport and second view content within the second viewport.

Specifically, the disclosed systems and techniques allow for a plurality of viewports to be identified and/or provided within a flexible display based upon detection of various manipulations in shape of the flexible device. The plurality of viewports may be provided based on the detected bends, folds, rolls, stretches, and/or other manipulations of shape of the flexible display. In certain embodiments, a bulge detector may be provided. The bulge detector may detect minor bulges within the flexible display that, while deforming the flexible display, may not be indicative of bends within the flexible display and, thus, may not affect the content rendered on the viewport(s).

The system and techniques described herein allow for flexible displays to be more fully utilized. For example, the content presented on a manipulated flexible display may be adapted in response to the manipulations of the flexible display. Accordingly, more usable content may be provided by such manipulated displays. Additionally, the techniques described herein allow for better integration of accessibility applications, as well as other applications, and a more pleasant user experience of flexible displays.

Figure 1:
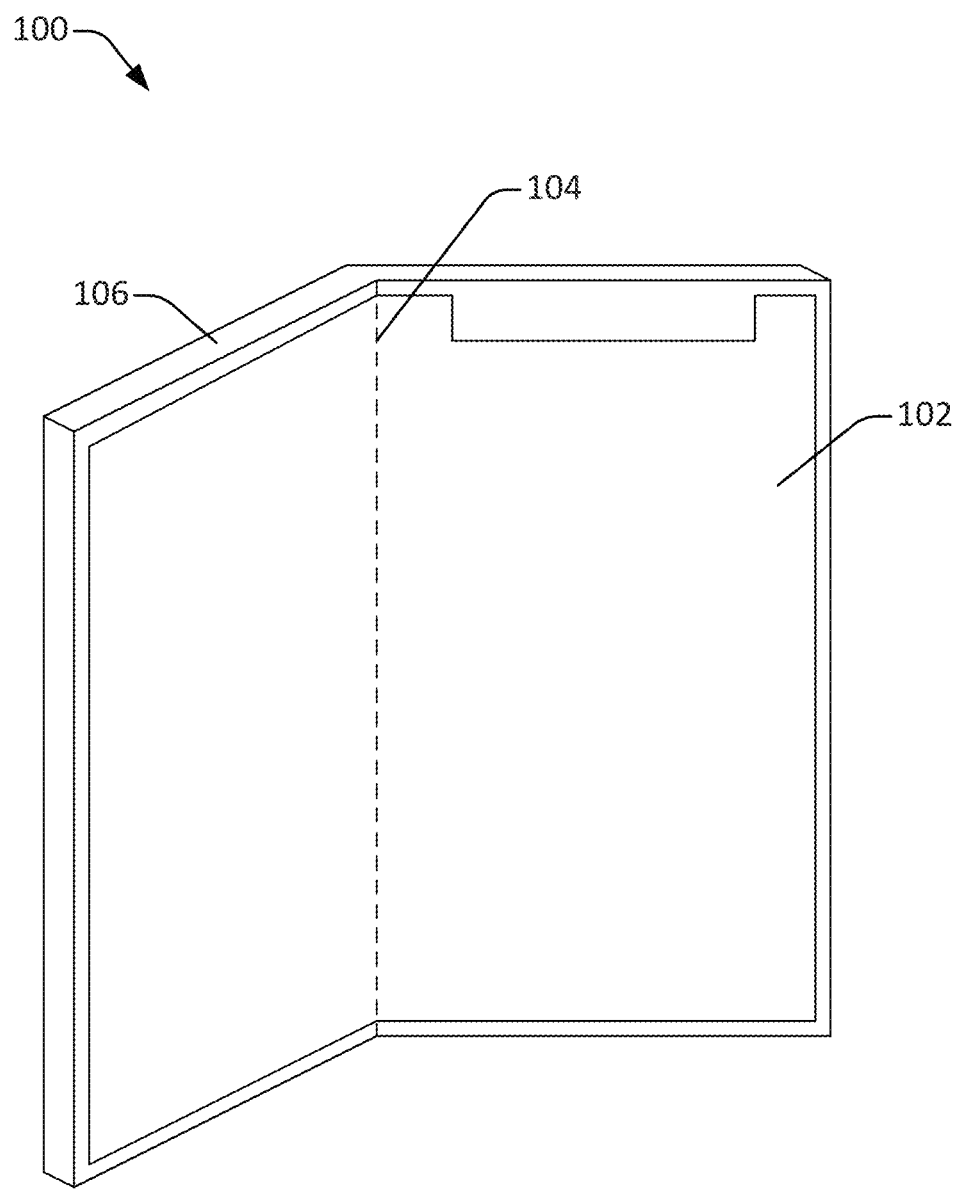
FIG. 1 illustrates an example device with a flexible display, configured in accordance with one or more embodiments.

FIG. 1 illustrates an example device with a flexible display, configured in accordance with one or more embodiments. FIG. 1 illustrates device 100 that includes device body 106 with flexible display 102. Flexible display 102, along with, in certain embodiments, device body 106, may be configured to bend, fold, roll, stretch, and/or otherwise be manipulated in shape in one or more directions. Thus, flexible display 102 in FIG. 1 may be bent along bend 104. In certain embodiments, flexible display 102 may be configured to be bent in a plurality of directions and/or configured to be bent with a plurality of simultaneous bends. Systems and techniques for detecting the bends and other manipulations are described herein.

Figure 2:
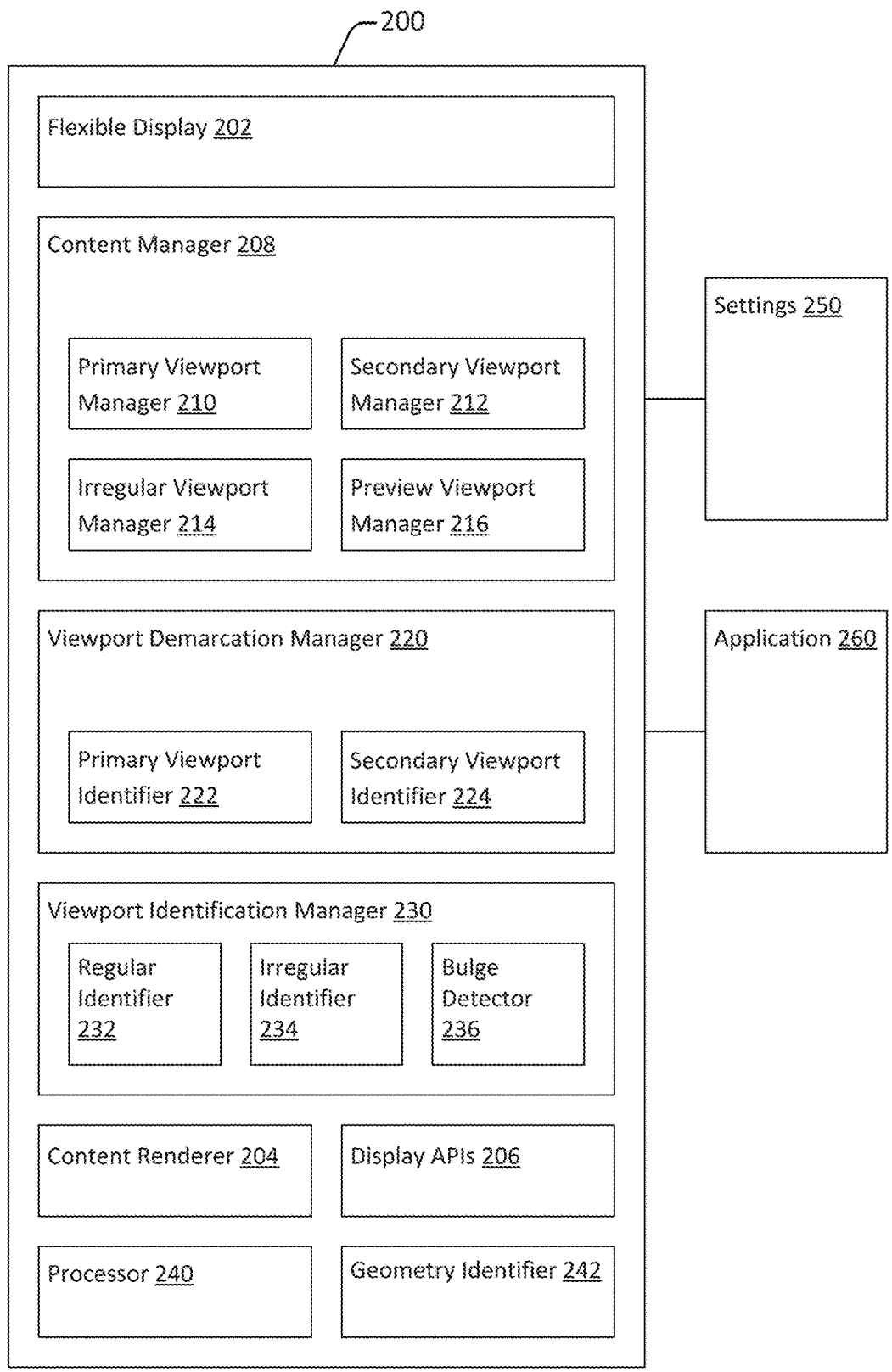
FIG. 2 illustrates a block diagram of an example device with a flexible display configured to provide a plurality of viewports, configured in accordance with one or more embodiments.

FIG. 2 illustrates a block diagram of an example device with a flexible display configured to provide a plurality of viewports, configured in accordance with one or more embodiments. FIG. 2 illustrates device 200. Device 200 includes flexible display 202, content manager 208, viewport demarcation manager 220, viewport identification manager 230, content renderer 204, display APIs 206, processor 240, and geometry identifier 242.

Flexible display 202 is electrically powered and may be configured to be bent, folded, rolled, stretched, and/or otherwise manipulated in shape in one or more directions and display graphics or other outputs. The graphics of flexible display 202 may be electronically generated. In certain embodiments, flexible display 202 and/or device 200 may include one or more cameras. Such cameras may include one or more front facing cameras. The cameras may be utilized to, for example, determine a location of the user relative to device 200 and/or flexible display 202, determine a view focus of the user relative to device 200 and/or flexible display 202 (e.g., to center a main viewport in the line of sight of the user).

Geometry identifier 242 is electrically coupled to flexible display 202. Thus, geometry identifier 242 is configured to identify folds, bends, rolls, and stretches within flexible display 202. In various embodiments, flexible display 202 may be divided into a plurality of different portions of regions. Some such flexible displays may be divided into, for example, hundreds or thousands of regions. In various embodiments, geometry identifier 242 may utilize a potentiometer and may be configured to determine electrical potential differences between the different portions or regions of flexible display 102 and, based on the potential differences, identify folds, bends, rolls, and/or stretches within flexible display 202. Geometry identifier 242 may provide signals (e.g., electrical signals) to the other components of device 200, to allow for determination of various viewports, as described herein.

Viewport identification manager 230 may be configured to identify viewports within flexible display 202, based on the bending, folding, rolling, stretching, and/or other manipulation of flexible display 202 detected by geometry identifier 242. Viewport identification manager 230 may include regular viewport identifier 232, irregular viewport identifier 234, and bulge detector 236. Regular viewport identifier 232 identifies regularly shaped (e.g., rectangular shaped) viewports within flexible display 202, based on the bending of flexible display 202. Irregular viewport identifier 234 identifies irregularly shaped (e.g., non-rectangular shaped) viewports within flexible display 202. Regular viewport identifier 232 and/or irregular viewport identifier 234 may identify viewports based on, at least, inputs from Display APIs 206, in combination with electrical signals from geometry identifier 242.

In certain embodiments, geometry identifier 242 may be an electrical device configured to sense electrical potential differences and provide signals accordingly. Display APIs 206 may then identify one or more viewports based on the signals from geometry identifier 242. Viewport identification manager 230 may then classify the various identified viewports (e.g., main viewport, secondary viewport, regular viewport, irregular viewport, and other such viewports). In certain embodiments, regularly shaped viewports may be used to display the content of the applications and/or other items that are configured to output a regular (e.g., rectangular) shaped view. Irregularly shaped viewports may be used to display content that does not require a regularly shaped view, such as filler or side content (e.g., the time, weather, and/or other such content).

Bulge detector 236 may be configured to identify minor bulges within flexible display 202. In certain embodiments, such minor bulges are treated as a continuity of a viewport, as they minimally hinder the user experience, and not as divisions in flexible display 202 (such as bend 104 of FIG. 1) that result in dividing flexible display 202 into multiple viewports. In certain embodiments, display APIs 206 may receive the electrical signal from geometry identifier 242 and identify the viewports and bulges accordingly. Bulge detector 236 may then receive the signal, as a portion of viewport identification manager 230, and classify the bulges accordingly. In certain embodiments, for example, display APIs 206 may classify bends and bulges based on their respective categories, but, in other embodiments, display APIs 206 may classify bends, folds, rolls, stretches, and/or other manipulations in shape of flexible display 202 based on a numerical identifier or rating or another technique. For such an embodiment, the various components of viewport identification manager 230 (e.g., identifiers 232 and 234 as well as bulge detector 236) may then classify the manipulations in shape according to the numerical identifiers or ratings.

If the electrical signal indicates a potential difference past a threshold potential difference, the region may be determined to include a bend of flexible display 202. Otherwise, if the electrical signal indicates deformation of the region, but the electrical signal does not indicate potential difference past the threshold potential difference, the region may be determined to be a bulge of flexible display 202.

Viewport demarcation manager 220 may be configured to demark the various regular viewports identified by viewport identification manager 230. As such, the viewports identified by viewport identification manager 230 may be classified as a primary viewport, by primary viewport identifier 222, or a secondary viewport, by secondary viewport identifier 224. In various embodiments, secondary viewport identifier 224 may additionally classify secondary viewports as either a secondary main viewport or a secondary preview viewport.

Primary viewport identifier 222 may mark a viewport as a primary viewport. In various embodiments, the primary viewport may be a regular viewport, as identified by regular viewport identifier 232. The primary viewport may be used to display the primary content (e.g., the content that a user may be focused on, such as a view of an application that the user is currently utilizing). In certain embodiments, settings 250 may provide for the parameters of what defines a primary viewport. For example, in a certain embodiment, a primary viewport may be required to be at least a threshold percentage of flexible display 200, may be required to be within a specific aspect ratio range, may be required to include at least a threshold number of pixels, and/or other such requirements. In various embodiments, the primary viewport may be, for example, the largest regular viewport identified. Additionally or alternatively, the focus of the user's gaze upon flexible display 202 may be identified (e.g., by one or more cameras that may image the user's eyes). The primary viewport in such an embodiment may be the viewport that is directly within or closest to the user's gaze.

Secondary viewport identifier 224 may mark a viewport as a secondary viewport. In various embodiments, secondary viewports may be determined to be secondary main or secondary preview viewports. Secondary main viewports may be secondary viewports that are regularly (e.g., rectangular) shaped. Secondary preview viewports may be secondary viewports that are smaller than secondary main viewports and, thus, appropriate for preview content (e.g., a preview of a webpage). In various embodiments, settings 250 may provide parameters for viewport demarcation manager 220 to determine when a secondary viewport is a main viewport or a preview viewport. In certain additional embodiments, the position of the secondary viewport may also be identified (e.g., "Left", "Right", "Top" or "Bottom") based on the position of the second viewport. In such embodiments, flexible display 202 may include a fixed coordinate system with preset top, bottom, right, and left sides or a coordinate system set relative to the primary viewport. Additionally or alternatively, viewports may be identified based on their pixel location numbers. Viewports may also be identified numerically, with, for example, the primary viewport identified as viewport 1 and secondary viewports identified as viewports 2 to N.

Content manager 208 may be configured to manage content to be displayed on flexible display 202. In various embodiments, content manager 208 includes primary viewport manager 210, secondary viewport manager 212, irregular viewport manager 214, and preview viewport manager 216, as well as other viewport managers, as needed. Content manager 208 may manage content of application 260, to be displayed on flexible display 202. In certain embodiments, settings 250 may provide settings for specifying what type of content is shown in which type of viewport.

In various embodiments, flexible display 202 may be bent, rolled, stretched, folded, and/or otherwise manipulated. Based on the bending, rolling, stretching, folding, and/or other manipulation, flexible display 202 may be divided into one or more regular or irregular viewports, according to the techniques described herein. Each of primary viewport manager 210, secondary viewport manager 212, irregular viewport manager 214, and preview viewport manager 216, as well as other viewports, manages content within the respective viewports described herein.

Operation of content manager 208 may be influenced according to settings 250. Settings 250 may determine items (e.g., default or fallback items if no instructions are received) to be displayed within the various viewports. Thus, for example, settings 250 may be configured such that irregular viewport manager 214 causes irregular viewports to indicate the weather and/or the time. In various embodiments, content manager 208 may provide a sequence for determining what items to display within the viewports. Thus, for example, secondary preview viewport 212 may be primarily configured to provide weather or the time, but may, if accessibility mode is on, provide accessibility tools (e.g., screen readers). Thus, for example, accessibility tools may operate in background and determine the content provided in the primary viewport and provide accessibility tools within a secondary preview viewport to aid disabled users in understanding that content. Usage of the various viewports may utilize APIs to provide outputs.

Content renderer 204 may be configured to render content determined by content manager 208 on flexible display 202. As such, content renderer 204 may provide signals for display on content on flexible display 202.

Display APIs 206 may be configured to receive data from other components of device 200 and determine the visible area of flexible display 202 and/or the various viewports as well as the angles to the user of the various viewports. For example, display APIs 206 may be configured to determine the non-visible area of flexible display 202 (e.g., based on determined folding and/or rolling of flexible display 202). Display APIs 206 will then filter out the non-visible areas (e.g., configure flexible display 202 to not provide any output from the non-visible areas).

In various embodiments, the various components described herein may be stored within one or more databases. Such databases may include transitory or non-transitory memory devices as described herein and may include instructions for performing the processes described herein. In various embodiments, processor 240 may be configured to receive instructions (e.g., from the memory), receive electrical signals from geometry identifier 242, and/or cause and/or provide instructions to one or more components of device 200 to perform the techniques described herein (e.g., determining the various viewports and providing views through the various viewports).

Settings 250 may provide the view settings of device 200. Settings 250 may include techniques for identifying the various viewports, techniques for determining which of the viewports is primary, secondary, etc., determining whether each of the secondary viewports is a main view or a preview view, utilizing various components of device 200 to identify the viewing angle of the user relative to flexible display 202, displaying the views of the viewports, and/or for other techniques.

An example technique of settings 250 includes determining a percentage size of a viewport relative to the size of flexible display 202. Viewports over 50% may be classified as a primary viewport while a viewport less than 50% may be classified as either a primary viewport (if the viewport is determined to be the largest of the viewports) or a secondary viewport. In certain embodiments, viewports less than 50% of the size of the primary viewport may be classified as a preview viewport.

Additionally, settings 250 may be configured to determine the fallback content to be displayed in each of the views (e.g., the irregular preview may be configured to provide content such as the weather, a calendar, a clock, stock market tickers, and/or other such content when applications do not specify the viewports to be displayed within). In certain embodiments, settings 250 may include a default fallback configuration for displaying content. Settings 250 may be changed by a user or other party. As such, settings 250 may be modified and, accordingly, the items to be displayed by the viewports may be accordingly changed.

Application 260 may be one or more applications. Application 260 may be applications stored within the memory of device 200 and/or may be applications stored elsewhere (e.g., on the cloud). In various embodiments, application 260 may provide data associated with views for display on flexible display 202. In certain embodiments, application 260 may provide data for simultaneous display on a plurality of viewports. In such an embodiment, application 260 may accordingly be configured to, for example, display primary data on the main viewport and secondary data (e.g., data that is less urgently needed, such as page number) on a secondary viewport.

Figure 3:
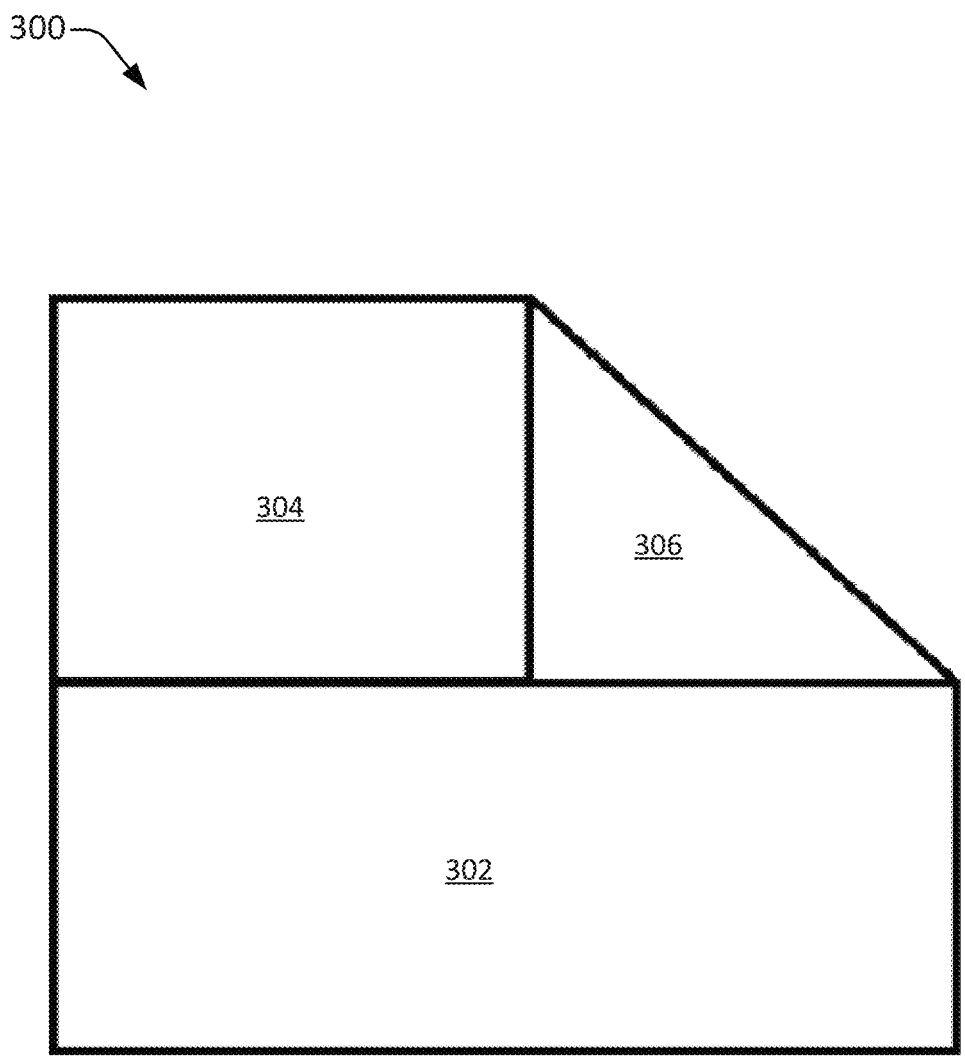
FIG. 3 illustrates an example configuration of a flexible display providing a plurality of viewports, configured in accordance with one or more embodiments.

FIG. 3 illustrates an example configuration of a flexible display providing a plurality of viewports, configured in accordance with one or more embodiments. FIG. 3 illustrates flexible display 300. Flexible display 300 has been folded in the manner shown in FIG. 3, with a top right corner folded to not be visible to the user. It is appreciated that the configuration of flexible display 300 shown in FIG. 3 may not be to actual scale. Thus, one or more sides of flexible display 300 may be shorter or longer.

The techniques described herein (e.g., in FIGS. 3 and 4, as well as elsewhere) may be performed by one or more components of devices as described herein. In various embodiments, the components that collectively perform the techniques (e.g., the processor, the API, and the content and viewport manager) may be collectively referred to as portions of a "controller."

Geometry identifier 242 may include a potentiometer and may determine, from the electrical potential differences of portions of flexible display 300, that the top right corner of flexible display 300 is bent. In various embodiments, the differences between electrical potential (e.g., the magnitude thereof) may indicate a degree of bending of the top right corner. Based on that potential difference, a potentiometer may provide electrical signals indicating that the top right corner of flexible display 300 is bent and the signal may allow calculation of the degree of bending.

The device may further determine a viewing angle of the user relative to flexible display 300. Accordingly, for example, the device containing flexible display 300 may include one or more cameras. The one or more cameras may provide image data (e.g., images of the location of the user and/or showing the direction that the gaze of the user is directed towards) and the controller of the device may determine, from the image data, the location of the user relative to flexible display 300. Thus, for example, the device may detect that the user is sitting straight in front of flexible display 300 or that the user's gaze is looking towards the center of flexible display 300. Furthermore, it may determine (e.g., with geometry identifier 242) that the top right corner of flexible display 300 is bent at least 90 degrees away from the rest of flexible display 300 and further determine that the top right corner is bent at an angle that makes the top right corner no longer visible to the user.

Based on such determinations, the viewports may be determined accordingly. In the embodiment shown in FIG. 3, viewports 302, 304, and 306 may be accordingly determined based on the detected bending of flexible display 300. Thus, the controller may determine that the visible portion of flexible display 300 may be bent into an irregular pentagon shape.

Based on the shape, the largest possible rectangular shape (e.g., based on pixel count) with sides parallel to the sides of flexible display 300 may be drawn. Such a shape may be viewport 302. As viewport 302 is the largest possible rectangular shape, viewport 302 may be designated as the primary viewport.

The remaining portion of flexible display 300 may be divided into the fewest number of rectangular viewports possible, with the largest remaining area of the remaining portion being a part of such rectangular viewports. Certain embodiments may prioritize determinations that create the fewest number of rectangular viewports or prioritize covering the largest remaining area with rectangular viewports. The leftover area may then be an irregular viewport of one or more triangular or other shaped irregular viewports, which may be determined from the leftover area.

In other embodiments, the fewest number of irregular viewports may first be determined from the remaining portion. Thus, for example, the fewest number of triangular viewports may first be determined to fill any irregularly shaped spaces. Once those shapes are filled, the rectangular shaped secondary viewports may then be determined.

Once the secondary viewports are determined, the secondary viewports may then be divided into secondary main viewports and secondary preview viewports. For example, rectangular secondary viewports (e.g., viewport 304) may be designated as secondary main viewports or secondary preview viewports while irregularly shaped viewports (e.g., viewport 306) may be designated as irregular viewports. Secondary main viewports may be secondary viewports that are larger in size than secondary preview viewports. Views may then be correspondingly assigned to the designated viewports.

Relative movement between flexible display 300 and the user may be determined (e.g., by one of more cameras, such as front and/or rear facing cameras, as well as accelerometers or gyroscopes) and the viewports may be changed accordingly based on the determined relative position of the user. As such, for example, if the user of FIG. 3 flips the flexible display 300 around, the portion of the display that is bent over may be determined to be the only portion of flexible display 300 that is visible to the user and, thus, may be the only viewport that will display content.

Figure 4:
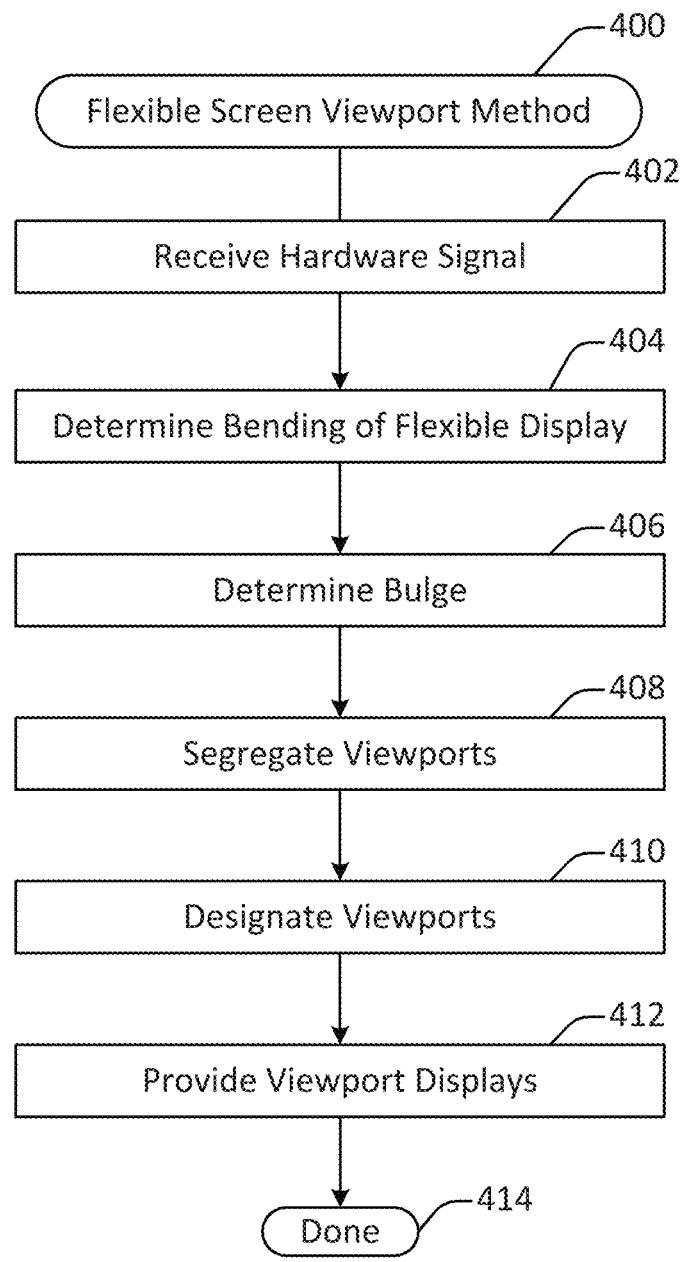
FIG. 4 illustrates an example technique of providing a plurality of viewports for a flexible display, performed in accordance with one or more embodiments.

FIG. 4 illustrates an example technique of providing display content for a plurality of viewports for a flexible display, performed in accordance with one or more embodiments. FIG. 4 illustrates flexible screen viewport method 400 for dividing a flexible display into a plurality of viewports based on one or more bends of the flexible display.

In 402, one or more components of the device (e.g., as described in FIG. 2) may receive a signal from one or more hardware components of the device. Thus, the one or more components may receive signals from the geometry identifier. Based on the signals, the geometry of the flexible display may be determined in 404. As such, based on the detected potential differences from portions of the flexible display, a determination may be made as to which portions of the flexible display are bent.

In 406, the bulge detector may determine whether one or more of the detected bends are actually bulges that should not be used in determining the viewports (e.g., based on the magnitude of the potential difference detected and/or through the techniques described herein). Such detected bulges may be disregarded when determining viewports of the flexible display. The controller may also determine which portions of the flexible display are visible to the user, through techniques described herein. The portions of the flexible display not visible to the user may be configured to not display views to the user.

In 408, viewports may be determined and segregated based on the bends. As such, based on the determined bends, the primary, secondary, and/or irregular viewports may be accordingly determined. After segregating the viewports, in 410, the viewports may be designated. Thus, the primary viewport may be designated for display of the primary content item for the user (e.g., the application that the user is currently using). The secondary viewports may be designated as either main viewports or preview viewports, according to the techniques described herein.

Based on the viewports segregated and designated, the viewports may provide view content in 412. Such views may include views of applications loaded on the device. Such applications may include working applications (e.g., customer relationship management (CRM), word processing, and/or other applications), gaming applications, multi-media applications (e.g., video players), previews (e.g., weather, stock, time, and/or other small items), and/or other such applications. The viewports may then accordingly provide the respective views to the user.

Figure 5:
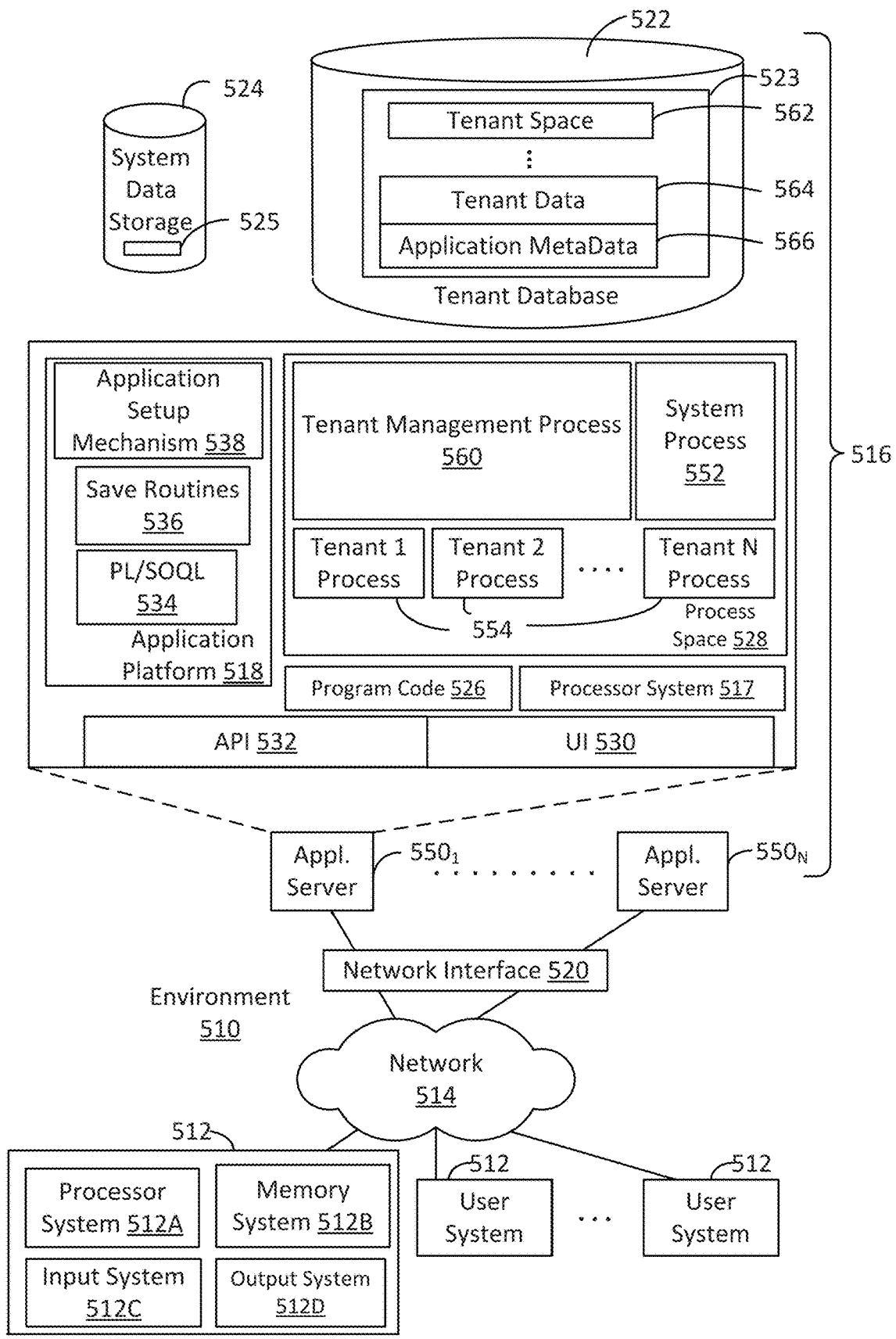
FIG. 5 shows a block diagram of an example of an environment that includes an on-demand database service, configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based application system. For example, in some implementations, system 516 may include application servers configured to implement and execute software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as an application, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
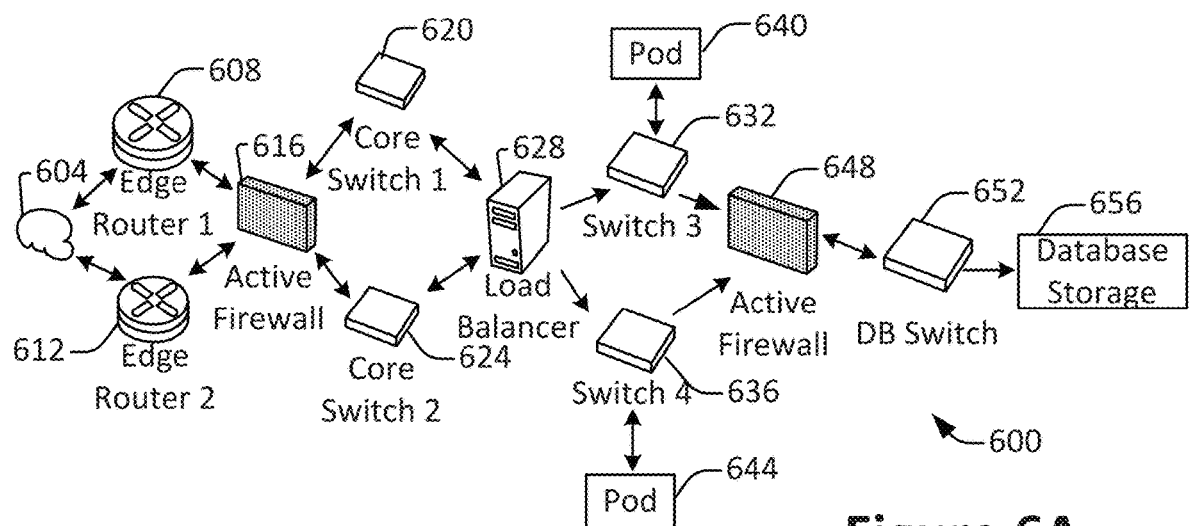
FIGS. 6A and 6B illustrate examples of a computing system, configured in accordance with one or more embodiments.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems 512 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process application information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
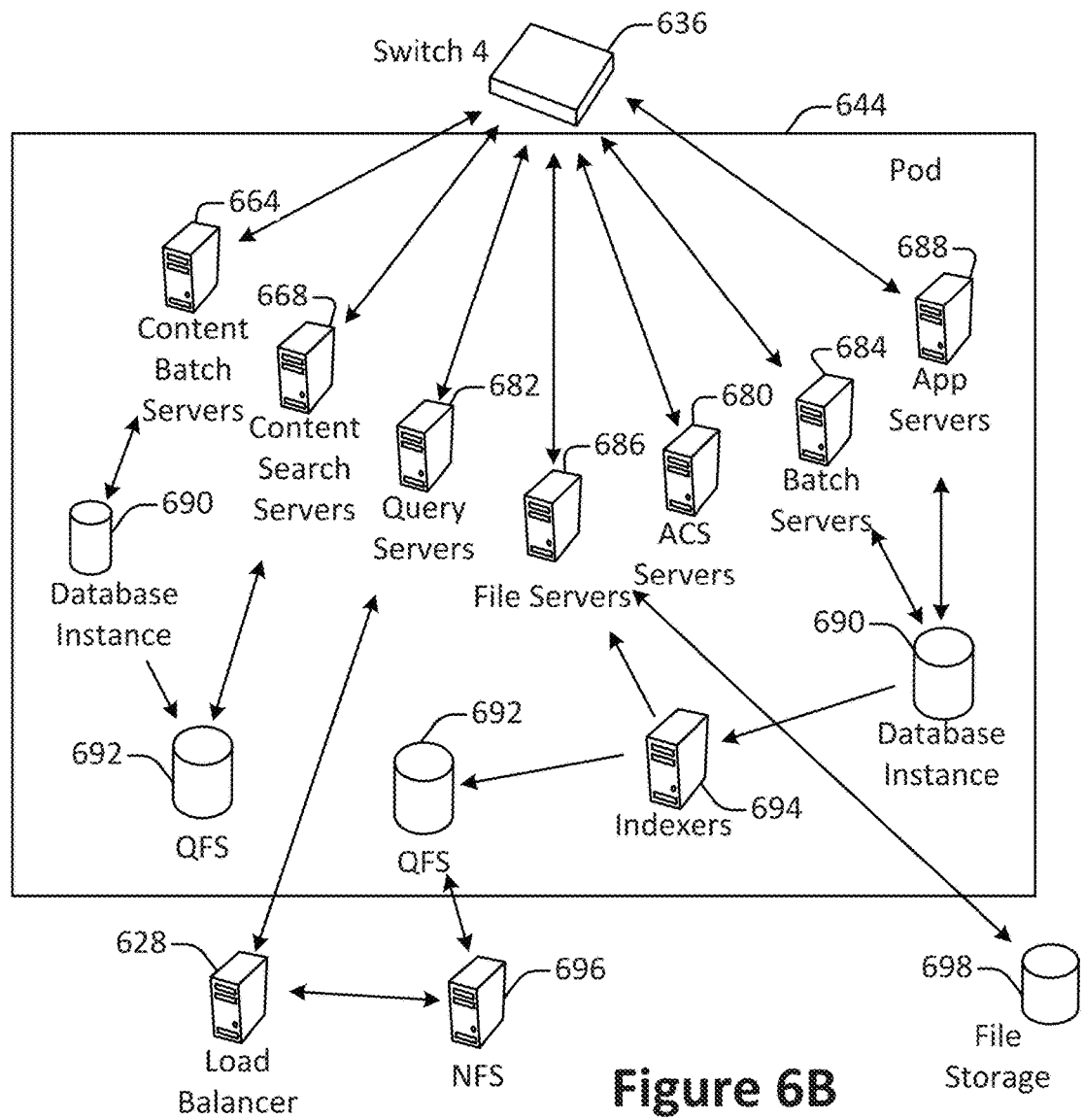

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
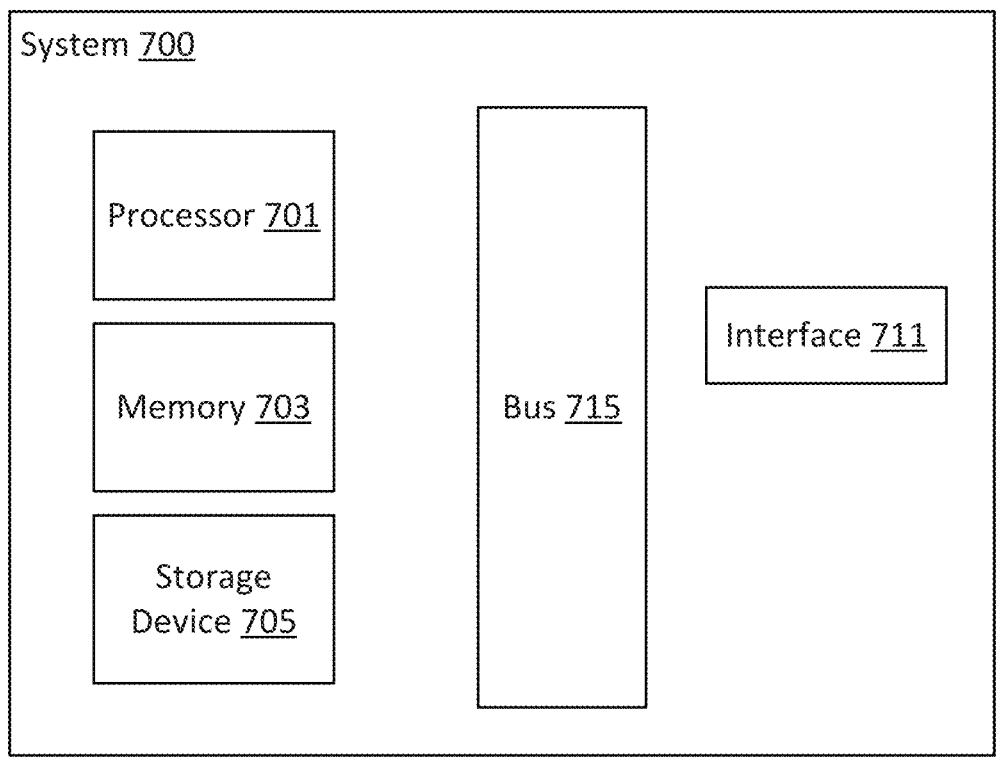
FIG. 7 illustrates an example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. An apparatus comprising:
   a flexible display, configured to bend in at least one direction;
   a geometry identifier, electrically coupled to the flexible display and configured to generate an electrical signal associated with bending of at least a portion of the flexible display;
   a controller, communicatively coupled to the geometry identifier and configured to perform operations comprising:
   receiving the electrical signal;
   determining, based on the electrical signal, a first bend of the flexible display;
   determining a location of the first bend on the flexible display;
   determining, based on the location of the first bend, a shape of a viewable portion of the flexible display;
   designating a first viewport by determining a largest possible rectangular portion of the viewable portion of the flexible display;
   designating a second viewport by determining a remaining possible rectangular portion of the viewable portion of the flexible display after designating the first viewport;
   designating an irregular viewport by determining a leftover non-rectangular portion of the viewable portion of the flexible display after designating the first viewport and the second viewport;
   segregating, based on the determining the location of the first bend, the display into the first viewport the second viewport, and the irregular viewport; and
   displaying a first view within the first viewport, a second view within the second viewport, and a third view within the irregular viewport.

2. The apparatus of claim 1, wherein the geometry identifier is configured to measure electrical potential differences within portions of the flexible display, and wherein the geometry identifier is configured to generate the electrical signal based on the electrical potential differences.

3. The apparatus of claim 2, wherein the geometry identifier comprises a potentiometer.

4. The apparatus of claim 3, further comprising:
a bulge detector, configured to determine bulges within at least a portion of the flexible display, wherein the operations further comprise:
determining a first bulge of the flexible display; and
determining that the first bulge is not indicative of a second bend of the flexible display.

5. The apparatus of claim 4, wherein the bulge detector is configured to determine that an electrical signal generated by the geometry identifier is below a threshold signal reading.

6. The apparatus of claim 4, wherein the segregating the display into at least the first viewport and the second viewport is further based on the determining that the first bulge is not indicative of a second bend of the flexible display.

7. The apparatus of claim 1, wherein the first bend defines an edge of the viewable portion.

8. The apparatus of claim 1, wherein the first viewport is larger than half of the viewable portion.

9. The apparatus of claim 1, wherein the operations further comprise:
determining that the second viewport is oriented at a threshold angle away from the first viewport; and
designating the second viewport as a non-visible viewport.

10. The apparatus of claim 1, wherein the operations further comprise:
determining, based on the electrical signal, a second bend of the flexible display;
designating, based on the determining the first bend and the determining the second bend, an additional viewport.

11. The apparatus of claim 1, wherein the
irregular viewport is triangular.

12. An method comprising:
receiving an electrical signal from a geometry identifier electrically coupled to a flexible display, the electrical signal associated with bending of at least a portion of a flexible display;
determining, based on the electrical signal, a first bend of the flexible display;
determining a location of the first bend on the flexible display;
determining, based on the location of the first bend, a shape of a viewable portion of the flexible display;

designating a first viewport by determining a largest possible rectangular portion of the viewable portion of the flexible display;
designating a second viewport by determining a remaining possible rectangular portion of the viewable portion of the flexible display after designating the first viewport;
designating an irregular viewport by determining a leftover non-rectangular portion of the viewable portion of the flexible display after designating the first viewport and the second viewport;
segregating, based on the determining the location of the first bend, the display into the first viewport, the second viewport, and the irregular viewport; and
displaying a first view within the first viewport, a second view within the second viewport, and a third view within the irregular viewport.

13. The method of claim 12, wherein the geometry identifier is configured to measure electrical potential differences within portions of the flexible display, and wherein the geometry identifier is configured to generate the electrical signal is based on the electrical potential differences.

14. The method of claim 13, wherein the geometry identifier comprises a potentiometer.

15. The method of claim 14, further comprising:
determining, with a bulge detector configured to determine bulges within at least a portion of the flexible display by determining that an electrical signal generated by the geometry identifier is below a threshold signal reading, a first bulge of the flexible display; and
determining that the first bulge is not indicative of a second bend of the flexible display.

16. The method of claim 15, wherein the segregating the display into at least the first viewport and the second viewport is further based on the determining that the first bulge is not indicative of a second bend of the flexible display.

17. The method of claim 12, wherein first bend defines an edge of the viewable portion.

18. The method of claim 12, wherein the first viewport is larger than half of the viewable portion.

19. The method of claim 12, further comprising:
determining that the second viewport is oriented at a threshold angle away from the first viewport; and
designating the second viewport as a non-visible viewport.

20. The method of claim 12, further comprising:
determining, based on the electrical signal, a second bend of the flexible display;
designating, based on the determining the first bend and the determining the second bend, an additional viewport.

* * * * *